No. 797,798. PATENTED AUG. 22, 1905.
H. ERNST.
SAUSAGE FILLING MACHINE.
APPLICATION FILED MAY 25, 1904.
2 SHEETS—SHEET 2.
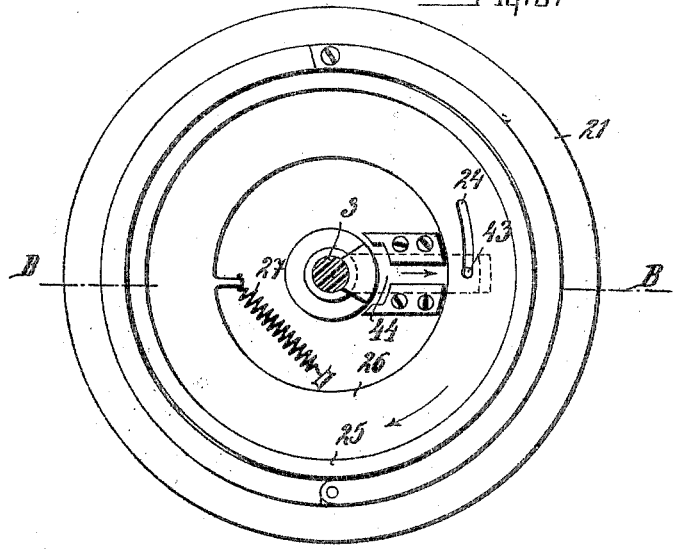
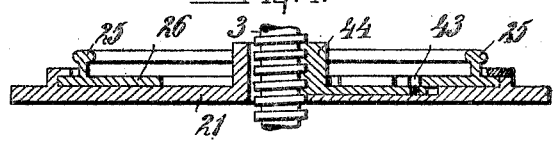
Witnesses:
Inventor:

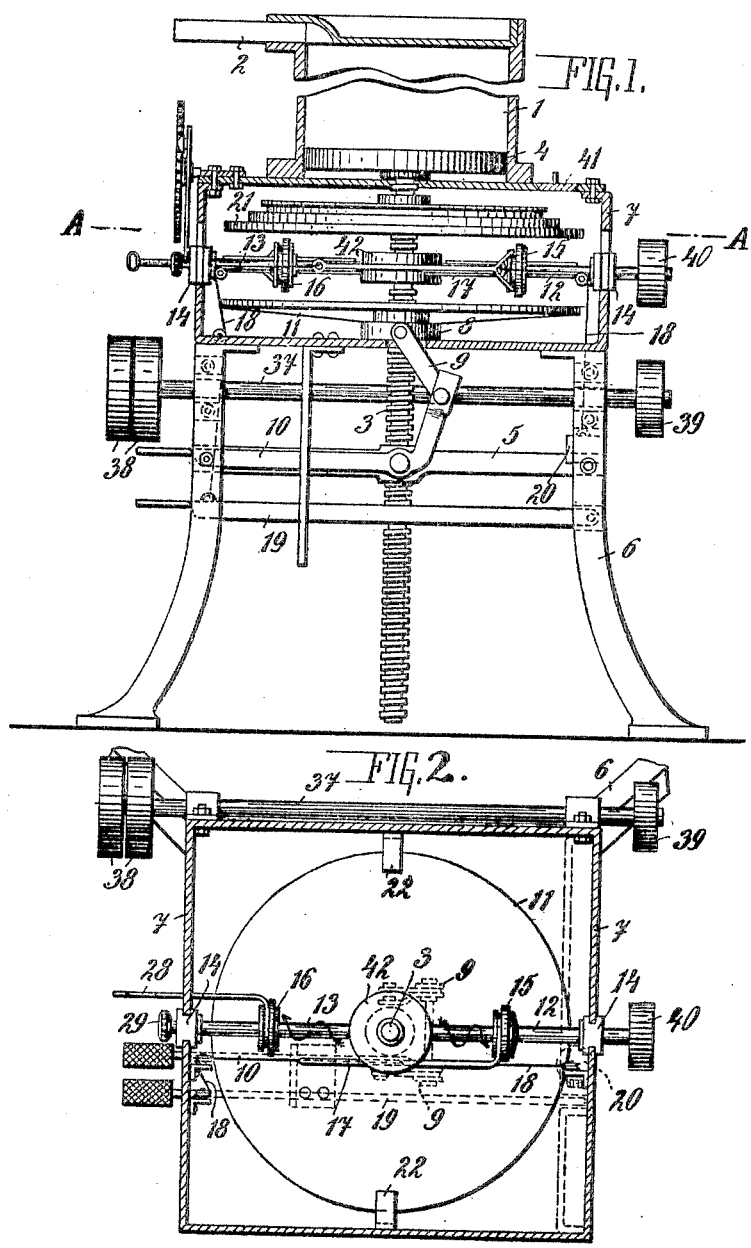

UNITED STATES PATENT OFFICE.

HANS ERNST, OF MÜNSTER, GERMANY.

SAUSAGE-FILLING MACHINE.

No. 797,798. Specification of Letters Patent. Patented Aug. 22, 1905.

Application filed May 25, 1904. Serial No. 209,743.

*To all whom it may concern:*

Be it known that I, HANS ERNST, a subject of the King of Prussia, residing at Münster, in the Province of Westphalia, Kingdom of Prussia and German Empire, have invented certain new and useful Improvements in Sausage-Filling Machines, of which the following is a specification.

The subject of the present invention is a machine for filling or stuffing sausages of all kinds, which presents the advantage over prior machines for the same purpose that by descending the piston for a slight distance on disengaging the driving-gear the piston is prevented from forcing surplus mince-meat into the already sufficiently-filled gut. Another advantage of the machine is that the speed at which it is run can be regulated as desired to suit the particular kind of sausage being manufactured at the time.

One form of construction of the machine is shown in the accompanying drawings, in which—

Figure 1 is a vertical section of the machine at rest; Fig. 2, a section on the line A A of Fig. 1; Fig. 3, a detail view showing a plan of the upper friction-disk drawn to an enlarged scale, and Fig. 4 a section on the line B B of Fig. 3.

The machine consists of a vertical vessel 1, preferably of cylindrical form, for the mince-meat. This vessel is provided at the top with a spout or nozzle 2, out of which the meat is forced and over which the gut to be filled is drawn. 4 is a piston reciprocating in the cylinder 1 and actuated by means of a screw-spindle 3, passing through the cross-bar 5 of the frame 6. The latter also carries a chamber 7, upon which the cylinder 1 stands. Inside the chamber 7 is located the driving-gear of the machine, which is thus protected from falling mince-meat or water.

On the bottom of the chamber 7 there rests a collar 8, which loosely embraces the spindle 3 and carries the friction-disk 11. Collar and disk can be raised for a certain distance on the spindle by means of the toggle-levers 9 10.

Above the disk 11 is a collar 42, constructed as a bearing for one end of each of the shafts 12 13, the other end of each of which shafts rests in an adjustable bearing-block 14, carried by the walls of the chamber 7.

The shafts 12 13, which are prevented from sliding by means of collars or like stops, carry friction-rollers 15 16, which slide upon them. The roller 16 is provided for the purpose of actuating a suitable indicator, which determines the weight of mince-meat to be filled into the sausage.

The collar 42 also carries the rod 17, one end of which is provided with a claw or fork which engages in a groove in the friction-roller 15. To the ends of the bar 17 chains, cords, or the like passing over small rollers are fastened, one cord being attached to the extremity of a lever 19 and the other cord to a weight 20.

At a certain distance above the friction-rollers 15 16 there is a second friction-disk 21, engaging with the spindle 3 in manner to be hereinafter described.

The friction-disk 21, which thus serves as support for the spindle 3 and piston 4 when the latter are no longer operated, is prevented from descending completely, and thus resting on the rollers 15 16, by means of stops 22, secured to the walls of the chamber 7 or in any other suitable manner.

For the purpose of immediately and rapidly returning the spindle 3 and piston 4 to their initial position when they have reached their highest position without, however, having to reverse the motion of the driving-gear of the machine that portion of the disk 21 which is provided with a female thread consists of a slide 44, carrying a pin 43. The disk 21 is also provided with an annular groove in which revolves a ring 26, furnished with an eccentric slot 24 to receive the pin 43 and a rim 25, which can be grasped by hand. If now the cover 41 is opened and the ring 26 turned in the direction of the arrow by the rim 25, which can be seized by the hand, inserted through the aperture in the chamber 7, the slot 24, in which the pin 43 engages, will push the slide 44 in the direction shown by the arrow, so that the slide is disengaged from the thread of the screw-spindle 3. The latter and the piston 4 are thus no longer supported, and so descend by reason of their own weight into the initial position. A spring 27 then returns the ring 26 to its initial position and the threaded slide 44 will again engage the spindle 3.

The operation of the machine is as follows:

After the vessel 1 has been filled with mince-meat and a gut secured to the spout 2 the lever 10 is depressed, so that the friction-disk 11 is pressed against the friction-roller 15, mounted on the shaft 12, which during working of the machine is constantly driven. The result is that the shaft 12 and roller 15 will rise also and the latter will be pressed against the upper disk 21, so that the latter is set in rotation. Owing to the disk 21, through the instrumentality of the slide 44, engaging in the thread of the spindle 3, which reciprocates the piston 4 in the vessel 1, the spindle 3 will be worked upward by the rotations of the disk 21, so that the piston 4 will press against the mince-meat in the vessel 1. The meat will thus be forced through the spout into the gut. Immediately a definite quantity of meat has been pressed into the gut the lever 10 must be again released, whereupon the disk 11, roller 15, and shaft 12, together with the roller 16, which will likewise have been raised, return to their initial position. Hereupon the spindle 3 will be at once prevented from rotating any longer, and likewise the piston 4 prevented from rising farther, and the spindle 3, together with the piston, and likewise the disk 21, by reason of their own weight will descend for about one-half an inch, the disk 21 then coming to rest upon the stops 22. The pressure of the piston on the mince meat in the vessel 1 thus completely ceases, so that it is effectually prevented from forcing any more meat into the gut after the latter has once received the correct quantity. The intestine can now be removed from the spout and replaced by a new one.

The speed of rotation of the spindle 3, and therefore the rate of operation of the piston 4, can be regulated as desired by means of the lever 19, connected with the rod 17, carrying the roller 15, the rod being moved to the left or right, depending upon whether the speed of rotation of the spindle is to be increased or diminished.

When the spindle 3, with piston 4, have finally attained the highest position desired, they can be returned to the initial position by the cover 41 being opened and the rim 25 turned by hand through a distance equal to the length of the slot 24. This will cause the slide 44, which carries the pin 43 and which couples the disk 21 with the spindle 3, to be drawn back in the direction of the arrow, Fig. 3, and the disk 21 will thus be brought out of engagement with the spindle 3. The latter being thus free will descend with the piston into its initial position.

As the moving parts are inclosed in the chamber 7, they are effectually protected from dust and dirt.

What I claim as my invention, and desire to secure by Letters Patent, is—

1. In a sausage-filling machine, the combination with a meat-receptacle, of a piston having a screw-threaded rod, two disks revolubly mounted on said rod, means on one of the disks for engaging the thread on the rod, an adjustable roller between the disks adapted to contact with them, and means for lifting the lower disk.

2. In a sausage-filling machine, the combination with a meat-receptacle, of a piston having a screw-threaded rod, two disks revolubly mounted on said rod, releasable means on one of the disks for engaging the thread on the rod, an adjustable roller between the disks adapted to contact with them, and means for lifting the lower disk.

3. A sausage-filling machine, comprising in combination a frame, a meat-receptacle supported thereby, a piston having a screw-threaded rod, two disks revolubly mounted on the rod and movable longitudinally thereof, means on one disk to engage the screw-thread, rollers between the disks adapted to contact with them, and stops on the frame to limit the longitudinal movement of the upper disk.

In testimony whereof I have signed my name to this specification in the presence of two subscribing witnesses.

HANS ERNST.

Witnesses:
   GUSTAV ELSNER,
   WILHELM KNEPPERS.